Patented Nov. 28, 1939

2,181,449

UNITED STATES PATENT OFFICE 2,181,449

DISPERSING AGENT AND METHOD OF MAKING THE SAME

Arthur E. Catanach and Eric Kolthoff, Port Arthur, Tex., assignors to Gulf Oil Corporation, Pittsburgh, Pa., a corporation of Pennsylvania No Drawing. Application September 27, 1938, Serial No. 232,008

2 Claims. (Cl. 260—504)

This invention or discovery relates to dispersing agents and methods of making the same; and it comprises a method of manufacturing a dispersing agent wherein a petroleum oil is treated with sulfuric acid, thereby producing an acid-treated oil and an acid sludge, the acid-treated oil and the sludge are separated from each other, the sludge is treated for separation therefrom of a black sulfuric acid, the acid-treated oil is neutralized with an aqueous solution of an alkali selected from the class consisting of caustic soda and sodium carbonate, the spent alkali solution is settled from and removed from the oil, and the spent alkali solution is caused to react with black sulfuric acid, to produce a dispersing agent; and the invention further comprises, as a new composition of matter, the dispersing agent produced by the above described process and characterized by partial solubility in oil, marked solubility in water, and high dispersive ability, all as more fully hereinafter set forth and claimed.

It is an object of the invention to provide an improved dispersing agent characterized by outstanding dispersive properties and having a wide field of application to various arts, including utilization as a water softener and detergent in laundering, dishwashing and similar operations; as an agent for dispersing petroleum oils and other oils in water, as an emulsifying and stabilizing agent in grease manufacture and other processes where it is necessary to keep two or more incompatible substances in homogeneous mixture; and as a base for glass and metal cleaning mixtures.

Another object is to provide an efficient and economical process for the manufacture of the new dispersing and emulsifying agent from petroleum refining by-products and waste products.

Further and more detailed objects achieved in the invention will become apparent as the description thereof proceeds.

One of the two principal raw materials used in the preparation of our new dispersing and emulsifying agent is a spent soda solution. This is available in practically all petroleum refineries and heretofore has had no commercial value. A brief description of modern treating methods used in the refining of petroleum will show the sources of this raw material. One step in the refining of numerous refinery products such as lubricating oils, waxes and transformer oils, is a treatment with sulfuric acid, used in various concentrations, ordinarily within the range of 66° Bé. acid to fuming acid (Nordhausen acid). Ordinarily the oil is pumped into an agitator, sulfuric acid is added, the mixture is thoroughly agitated, and finally the resultant acid sludge is allowed to settle and is withdrawn. The so-treated oil is pumped into another agitator where the remaining acidity is neutralized by washing the oil with a solution of caustic soda (sodium hydroxide) or soda ash (sodium carbonate), and then the so-used soda solution commonly known as spent soda solution, is settled out of the oil and withdrawn. Prior to this invention it has been the practice to discard this spent soda solution. It is invariable practice to use more soda solution than that which is theoretically necessary to neutralize the oil, so the settled spent soda solution is always somewhat alkaline. It also contains a substantial amount of sodium sulfate resulting from the reaction of the alkali and sulfuric acid, and complex soaps. These soaps give the spent soda solution a milky appearance, wherefore it is commonly referred to as "milk water." After the neutralization of the oil with a solution of caustic soda or soda ash, the final treating step consists of a water wash. It is the milk water or spent soda solution described ante that forms the principal raw material for the dispersing and emulsifying agent of the present invention; not the final wash water.

It is not essential that the spent soda solution be obtained from a treating process conducted precisely as that outlined ante. In the refining of petroleum products such as lubricating oils, waxes, transformer oils, and others, any treatment comprising a sulfuric acid treat, followed by a neutralization with caustic soda or soda ash, will yield a substantial quantity of spent caustic soda or soda ash, and soaps, suitable for utilization in the present invention.

In the preparation of the new dispersing and emulsifying agent, the complex alkaline mixture of spent caustic soda or soda ash, is reacted with "black" sulfuric acid, often called sludge acid. For the purposes of the instant specification and claims, "black sulfuric acid" refers to sulfuric acid, recovered from acid sludge formed (as described above) by the reaction of sulfuric acid on petroleum products. Typical examples of petroleum products commonly treated with sulfuric acid include gasoline, naphthas, kerosene, furnace oil, neutral oils, waxes, petrolatum and lubricating oils. The recovery of black sulfuric acid is a highly developed art and may be accomplished by any of the many well known methods. A substantial quantity of this acid separates as a lower layer when acid sludge is allowed to settle. A further quantity is formed by the addition of water to the acid sludge. Any concentration of the black sulfuric acid, up to and including 98 per cent sulfuric acid, is suitable for employment in the process of the present invention. Further, the black sulfuric acid may be concentrated to any desired strength prior to its use.

In the process for the manufacture of the dispersing and emulsifying agent, a suitable quantity of the spent aqueous caustic soda or soda ash, described ante, is pumped, conveniently at substantially atmospheric temperature, into any suitable treating vessel. A sufficient quantity of black sulfuric acid, at substantially atmospheric temperature, to produce a neutral or slightly alkaline solution is added and the mixture is thoroughly agitated; no heat, other than the heat of reaction, being supplied. The resulting mixture is a pale yellow cloudy solution which contains the dispersing and emulsifying agent of the present invention. This aqueous solution form of the dispersing and emulsifying agent is applicable directly to various utilizations, as will be more fully described hereinafter. The solution may be used as such, but ordinarily it is concentrated prior to use. Concentration may be effected by heating the material to drive off water, or by first preparing the product to a slightly acid condition, in which case a considerable part of the water can be settled out. The so concentrated material can then receive additional soda to bring it to an alkaline condition. Sometimes the two methods of concentration are used.

The quantity of black sulfuric acid necessary to neutralize the spent soda solution will vary over wide limits, depending on the specific source and concentration of each material, but is readily determined by trial. It has been found convenient to make a trial neutralization in the laboratory for each new batch of alkaline solution and black sulfuric acid. The solution of spent soda may be concentrated prior to the addition of the black sulfuric acid by removing part of the water, or the reaction product may be concentrated in the same manner. This water removal by heating may be effected by any well known means, e. g., atmospheric and vacuum distillation, or either of these two.

In handling, shipping, packaging, etc., it is convenient to concentrate the aqueous solution form of the dispersing and emulsifying agent described ante. The aqueous solution may be concentrated by removing a part of the water, e. g., by vacuum distillation, to produce a dispersing and emulsifying agent of any desired concentration. However, all of the water should not be removed. For several uses, as will be more fully described hereinafter, the aqueous solution may be distilled under vacuum until the water has been distilled off to the desired degree. The bottoms are a dark brown colored material of a grease-like consistency and retain all the dispersing and emulsifying power of the aqueous solution. The material is highly soluble in water and sparingly soluble in oil. This material will be referred to in the remainder of this specification as the concentrated dispersing and emulsifying agent.

The following specific uses of the dispersing and emulsifying agent are given by way of examples and are not to be taken as limitations of the invention.

The new preparation has detergent properties and is not readily precipitated by lime and magnesia in water. This makes it useful as a so-called water softener in laundering, dishwash: and the like. The aqueous solution form n be added directly to water, to increase the clea: ing power in the case of hard water and laund ing soap and to obviate the formation of inso ble precipitates which ordinarily are formed wh soap is used with hard water, and which app( on the surface as scum. With a typical aque( solution of the dispersing agent, containing ab( 0.65 pound solids per gallon, the amount of so tion to be added to hard water often ranges fr( about 20 to 200 gallons per 1000 gallons of wat The concentrated form of the new dispersi and emulsifying agent is also useful. The amou added to water is often from 5 to 25 pounds 1 1000 gallons water.

In petroleum refineries and other industr plants, particularly where salt or hard water used, the disposal of water used in various tre: ing processes presents a problem of considera! magnitude. This water quite often conta: gelatinous appearing solid soaps and other 1 soluble precipitates which float on the surfa of the water, as well as colloidal precipita! that are suspended throughout the water, maki the water obnoxious and difficult to remove t precipitates from before discharging it into or( nary drainage channels. These soaps and pr cipitates mix with small quantities of oil, wax a: mud, which are sometimes present in the wat further to complicate the problems of clarific tion and disposal. We have found, however, th a small quantity of the aqueous solution form the dispersing and emulsifying agent of this i vention will prevent the formation of the troublesome soaps and precipitates; and furth that it will completely disperse any such soa and precipitates that may be formed prior to : addition. The quantity of the aqueous soluti( form of the dispersing and emulsifying age necessary to treat such drainage waters will va considerably, depending upon the specific sour and concentration of soaps and precipitates the water. Usually about 10 pounds per 10 gallons is sufficient to treat the most troubleson water. The concentrated dispersing and emuls fying agent may also be used for these purpos by first preparing an aqueous solution of any d sired concentration. The new agent is also w( adapted for treating oil wells, as in cleanii strainers, flushing, etc. It resists precipitation l salt water (NaCl); even sea water.

In the field of grease manufacturing, one the principal problems of research has been provide a grease that has a uniform consisten( over a wide range of operating conditions, whi( will not break down or separate on being sul jected to high temperatures and to repeat( heating and cooling, and which will not separa or "leak" oil when stored. Incorporation of th new dispersing agent in greases results in sul stantial improvement. The application of th invention to cup greases will be discussed, bi it is to be understood as illustrative only. Tl ordinary soap greases, i. e., calcium soap grease commonly have approximately the following con position by weight:

| | Per cei |
|---|---|
| Lubricating oil | 54–! |
| Soap | 4–! |
| Water | 0–! |

We have found that the addition of a sma amount, about 1 to 10 per cent, of our concer trated dispersing and emulsifying agent t greases made in accordance with ordinary cup grease practice, will produce a grease highly superior to those of the prior art, the dispersing and emulsifying agent being added at the end of the otherwise conventional manufacturing operation but prior to final cooling. Thus, for instance, these greases may suitably be made by mixing the necessary lime with a small amount of water, and an amount of oil about equal to the fatty acid to be used, in a steam-jacketed grease mixing kettle. The fatty acid to be used in the manufacture of the soap is then added and heat is applied. After an interval of about 40 to 60 minutes, when the temperature has reached 240-260° F., the soap is ready for mixing. About 2 to 3 per cent of water is added, and when the batch foams up it is driven down by the addition of oil, the heat being abstracted by the addition of cold oil and by the evaporation of water, so that the temperature drops to about 230° F. Oil is added until the batch contains about 25 per cent soap, and during this interval the temperature drops gradually until it reaches about 205-210° F. If the desired soap percentage is about 15, the batch should reach a temperature of about 180-190° F. at this point. This process is about the same when fats are used instead of fatty acids, except that it requires 12 to 20 hours at 240-260° F. to effect the saponification of the fats. After the addition of the final amount of oil, but prior to final cooling, the desired amount of concentrated dispersing and emulsifying agent is added and stirred in and the grease is then cooled and packaged in the normal manner.

The greases made with the aid of the dispersing agent of this invention will normally have, for example, the following weight composition:

| | Per cent |
|---|---|
| Lubricating oil | 54-96 |
| Soap | 3-35 |
| Concentrated dispersing and emulsifying agent | 1-10 |
| Water | 0-3 |

Relatively inert materials such as powdered metals, flake graphite, mica, asbestos fibers, small amounts of glycerine, fats, etc., can be incorporated in the grease in known ways without departing from the spirit of this invention, and these relatively inert materials are not included in figuring the composition of the grease.

Cup greases, as well as other greases, containing from about 1 to 10 per cent of our new concentrated dispersing and emulsifying agent, maintain a uniform consistency over a wide range of operating conditions, do not break down or separate when subjected to high temperatures and to repeated heating and cooling, and do not separate or "leak" oil when stored. In addition the dispersing and emulsifying agent appears to contain compounds which considerably enhance the lubricating power of the greases made therewith.

We have found that a highly efficient cleaning solution for glass, metal, etc., may be prepared from our new dispersing and emulsifying agent. This solution is prepared by the addition of about 1 to 3 parts of water by volume to 1 part of the aqueous solution form of the dispersing and emulsifying agent. The glass and metal cleaner may also be prepared by dissolving about 1 to 3 per cent of the concentrated dispersing and emulsifying agent by weight in water. If it is desired to prepare a quick drying glass and metal cleaning solution, from about 3 to 30 per cent of alcohol or other soluble volatile liquid (percentage by weight on the total composition) may be incorporated with the mixture of water and dispersing and emulsifying agent. The dispersing and emulsifying agent gives the metal or glass cleaning solution a very pleasing odor.

Our invention has an additional very substantial virtue in that numerous refineries have a certain amount of alkaline milk water to dispose of and a certain amount of black acid to dispose of, and our invention permits of utilizing these materials to make valuable products in a way which avoids pollution of drainage streams with either alkali or acid. In fact, the product of our invention can be introduced into water for the purpose of preventing precipitation and deleterious action on plant and marine growth by any small amount of petroleum which may have accidentally gotten into the water.

What we claim is:

1. A dispersing agent comprising the reaction product of black sulfuric acid and a spent alkaline petroleum-refining neutralizing agent which neutralizing agent is selected from the class consisting of caustic soda and sodium carbonate; said reaction product characterized by being sparingly soluble in mineral oils and highly soluble in water, having a brownish greasy appearance and having marked dispersing and emulsifying properties.

2. A method of making a dispersing agent comprising the steps of bringing about reaction in the presence of water between black sulfuric acid and a spent alkaline petroleum-refining neutralizing agent which agent is selected from the class consisting of caustic soda and sodium carbonate, the amounts of said acid and spent agent being such as to leave the reaction product substantially neutral, and recovering the reaction product as the new dispersing agent.

ARTHUR E. CATANACH.
ERIC KOLTHOFF.